Patented Dec. 8, 1931

1,835,755

UNITED STATES PATENT OFFICE

EDGAR C. BRITTON, OF MIDLAND, MICHIGAN, ASSIGNOR TO THE DOW CHEMICAL COMPANY, OF MIDLAND, MICHIGAN, A CORPORATION OF MICHIGAN

METHOD FOR PURIFICATION OF ORTHO-PHENYL-PHENOL

No Drawing.    Application filed October 22, 1930.   Serial No. 490,551.

The present invention concerns a method for the purification of orthophenylphenol.

As a by-product prepared industrially from residual tar obtained in the preparation of phenol by reacting chlorobenzene with aqueous sodium hydroxide, orthophenylphenol usually has a decided color and odor and is contaminated with small amounts of phenol and paraphenylphenol, together with alkali-insoluble impurities, e. g. diphenyl oxide, diphenylene oxide, diphenyl, chlorodiphenyl, and the like. Separation of such impurities from the crude orthophenylphenol by fractional distillation necessitates a lengthy procedure, and the final product still contains small amounts of impurities. Crystallization of said crude material from organic solvents also requires a complicated procedure and entails solvent recovery. Consequently, such purification methods are unsatisfactory for industrial purposes where a very pure product is desired. I now have found that the crude orthophenylphenol may be purified by treating the same with aqueous caustic alkali, separating alkali-insoluble impurities from the liquor and then crystallizing alkali-metal orthophenylphenate from the alkaline solution, the alkali-metal phenate and alkali-metal paraphenylphenate remaining in solution. The crystalline salt may then be separated from the residual liquor and converted into free orthophenylphenol in any suitable way, both the so-produced salt and free ortho compound being substantially pure and free from color and odor.

My invention, then, consists of the method hereinafter fully described and particularly pointed out in the claims, the following description setting forth in detail several modes of carrying out my invention, such disclosed modes illustrating, however, but several of the various ways in which the principle of my invention may be used.

In carrying out my invention, crude orthophenylphenol is dissolved in excess aqueous sodium hydroxide solution, as an example of a caustic alkali, to make approximately a 20 to 60 per cent solution containing excess base, which is then extracted with a solvent such as chlorobenzene, benzene, carbon tetrachloride, ethylene dichloride, etc., to remove the above mentioned alkali-insoluble impurities. The extracted solution may then be heated or otherwise treated to remove dissolved or residual traces of solvent therefrom, and evaporated or diluted until the concentration of the sodium orthophenylphenate therein is such that the later may be crystallized therefrom by suitable procedure, i. e., a concentration of approximately 40 to 60 per cent. The solution may then be cooled to a crystallizing temperature for instance about 50° or lower depending on the strength of the sodium salt solution, and sodium orthophenylphenate crystallized therefrom in the form of crystals containing usually from three to five molecules of water of crystallization, depending upon the crystallization condition, which crystals may be separated from the mother liquor in any suitable way, such as by filtration or centrifugation of the same, the so obtained crystals preferably being washed with an aqueous solution of the sodium salt itself. If desired, the product may be recrystallized. The so obtained crystals may then be converted into free orthophenylphenol by dissolving the same in water, and acidifying the so obtained solution with an acid, e. g., carbon dioxide, hydrochloric acid, sulphuric acid, etc., thereby precipitating free orthophenylphenol. The latter then may be separated from the residual liquor and may or may not be distilled, whereby pure orthophenylphenol is obtained in white form substantially free from impurity.

The following example represents one of the various ways of carrying out my invention:—

*Example 1.*—400 pounds of crude orthophenylphenol fractionated from phenol tar, having a blue color, a m. p. of about 52°, and containing about 5 per cent of impurities, was dissolved in an aqueous solution of 104 pounds of sodium hydroxide in 597 pounds of water by warming at about 60° C. The so obtained solution was extracted three times with chlorobenzene, using 140 pounds of the latter for each extraction; steam distilled to remove residual chlorobenzene and 10 per cent of the water, and sodium orthophenylphenate crystallized therefrom at a temperature of from 47° down to 31° C., in amount equal to 389 pounds of the anhydrous salt, or an 86 per cent yield. The crystals were then dissolved in water, the so obtained solution acidified with hydrochloric acid, and the precipitated orthophenylphenol separated from the residual solution and dried, the final product freezing at 56° to 57° C.

The residual mother liquor obtained from the recrystallization of the salt gave on acidification thereof a brownish material containing substantially all the alkali-soluble impurities including the small amount of paraphenylphenol present in the original crude phenylphenol.

If the crude orthophenylphenol contains an appreciable amount of the corresponding para compound, say as much as 5-10 per cent of the latter, which has not previously been separated from the ortho compound by fractional distillation, such paraphenylphenol may be precipitated from the solution of alkali-metal salts previous to crystallization of the sodium orthophenylphenate, for instance as disclosed in my patent applications, Serial Nos. 411,760; 411,761; 411,762; filed December 5, 1929, by preferential hydrolysis, partial acidification, or by precipitation of a relatively insoluble compound of the paraphenylphenol. Still another way of separating the para- and orthophenylphenols previous to crystallization of the sodium salt of the latter, is to treat the mixed free para and ortho compounds with alkali-metal base in amount sufficient to dissolve substantially only the ortho and leave the para compound as a solid.

Briefly, my invention involves improvements in purifying orthophenylphenol, such improvements comprising dissolving the same in aqueous alkali, removing alkali-insoluble impurities therefrom, crystallizing alkali-metal orthophenylphenate therefrom, and converting the latter into free orthophenylphenol, the resulting product being substantially white, free from undesirable odor, and pure. Furthermore, my invention, which has been described above as applying to the purification of orthophenylphenol obtained as a by-product from the hydrolysis of benzene halides, may be utilized for the purification of crude orthophenylphenol from other sources.

Other modes of applying the principle of my invention may be employed instead of those explained, change being made as regards the improvements herein disclosed, provided that the details stated by any of the following claims or the equivalent thereof be employed.

I therefore particularly point out and distinctly claim as my invention:—

1. The method of purifying orthophenylphenol which comprises reacting the same with caustic alkali, crystallizing the so formed alkali-metal orthophenylphenate, and then converting the crystallized material into free orthophenylphenol.

2. The method of purifying orthophenylphenol which comprises reacting the same with aqueous sodium hydroxide, crystallizing the thereby-formed sodium orthophenylphenate from the solution, and then converting the crystallized salt into free orthophenylphenol.

3. The method of purifying orthophenylphenol which comprises dissolving the same in a slight excess of aqueous sodium hydroxide, crystallizing the thereby-formed sodium orthophenylphenate, separating crystals, and then acidifying the crystallized material in the presence of water to convert said salt into free orthophenylphenol.

4. The method of purifying orthophenylphenol which comprises dissolving the same in aqueous sodium hydroxide, separating alkali-insoluble material therefrom, crystallizing the thereby-formed sodium orthophenylphenate from the aqueous solution thereof, and converting said salt into free orthophenylphenol.

5. The method of purifying orthophenylphenol which comprises dissolving the same in aqueous sodium hydroxide, extracting the alkali-insoluble material with an organic solvent, crystallizing the thereby-formed sodium orthophenylphenate from the aqueous solution thereof, and converting said salt into free orthophenylphenol.

6. The method of purifying orthophenylphenol which comprises dissolving the same in aqueous sodium hydroxide, extracting the alkali-insoluble material with an organic solvent, steam distilling the aqueous solution to remove residual organic solvent, crystallizing the thereby-formed sodium orthophenylphenate from the aqueous solution thereof, separating crystals, and then acidifying the crystallized salt in the presence of water to form free orthophenylphenol therefrom.

7. The method of purifying orthophenylphenol which comprises dissolving the same in excess of aqueous sodium hydroxide to make approximately a 20 to 60 per cent solution, separating alkali-insoluble impurities therefrom, adjusting the concentration of the aqueous solution to approximately 40 to 60 per cent of sodium orthophenylphenate, crystallizing the latter, and converting the crystallized material into free orthophenylphenol.

8. The method of purifying orthophenylphenol which comprises dissolving the same in excess of aqueous sodium hydroxide to make approximately a 20 to 60 per cent solution, extracting the aqueous solution with a substantially water-insoluble organic solvent, steam distilling residual organic solvent from the aqueous solution, adjusting the concentration of the solution to approximately 40 to 60 per cent of sodium orthophenylphenate, crystallizing the latter, separating crystals, and acidifying the crystallized material with mineral acid in the presence of water to form orthophenylphenol therefrom.

9. The method of purifying orthophenylphenol which comprises reacting the same with aqueous caustic alkali, separating paraphenylphenol therefrom, crystallizing alkali-metal orthophenylphenate from the residual aqueous liquor, and then converting the crystallized material into free orthophenylphenol.

Signed by me this 18 day of October, 1930.
EDGAR C. BRITTON.